US009407466B2

(12) United States Patent
Ansley

(10) Patent No.: US 9,407,466 B2
(45) Date of Patent: Aug. 2, 2016

(54) ADAPTIVELY DELIVERING SERVICES TO CLIENT DEVICES OVER A PLURALITY OF NETWORKING TECHNOLOGIES IN A HOME NETWORK

(75) Inventor: Carol J. Ansley, Johns Creek, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 25 days.

(21) Appl. No.: 13/236,246

(22) Filed: Sep. 19, 2011

(65) Prior Publication Data
US 2013/0073674 A1 Mar. 21, 2013

(51) Int. Cl.
*G06F 15/173* (2006.01)
*H04L 12/26* (2006.01)
*H04L 12/66* (2006.01)

(52) U.S. Cl.
CPC ........................... *H04L 12/66* (2013.01)

(58) Field of Classification Search
CPC ... H04L 29/08072; H04L 29/06; H04L 43/00; H04L 12/2602; H04L 41/22; H04L 41/0213; H04L 41/12; H04L 47/10; H04L 43/50; H04L 12/2697; H04L 43/0852
USPC .......................................................... 709/225
See application file for complete search history.

(56) References Cited

U.S. PATENT DOCUMENTS

| | | | | | |
|---|---|---|---|---|---|
| 2002/0059434 | A1* | 5/2002 | Karaoguz | ........... | H04L 12/5692 709/228 |
| 2002/0087674 | A1* | 7/2002 | Guilford | ............... | H04W 48/18 709/223 |
| 2002/0095498 | A1* | 7/2002 | Chanda | ............... | H04L 12/2889 709/225 |
| 2002/0099967 | A1* | 7/2002 | Kawaguchi | ........... | G06F 1/3203 713/323 |
| 2004/0125779 | A1* | 7/2004 | Kelton | ................... | H04W 72/12 370/338 |
| 2005/0047400 | A1* | 3/2005 | Ansley | .............. | H04L 29/06027 370/352 |
| 2009/0249418 | A1* | 10/2009 | Alastruey Gracia | ............... | H04N 7/17318 725/114 |
| 2009/0296578 | A1* | 12/2009 | Bernard | ................ | H04L 41/509 370/231 |
| 2009/0322556 | A1* | 12/2009 | Cook | ..................... | G01D 4/004 340/870.02 |
| 2010/0061364 | A1* | 3/2010 | Damola | ............. | H04L 12/5692 370/352 |
| 2010/0208699 | A1* | 8/2010 | Lee | ................... | H04W 36/0055 370/331 |
| 2011/0013529 | A1* | 1/2011 | Bin | ..................... | H04L 12/2878 370/252 |
| 2011/0077058 | A1* | 3/2011 | Cai | ......................... | H04L 12/14 455/573 |
| 2012/0017012 | A1* | 1/2012 | Bartholomay | ...... | H04L 41/5041 710/51 |
| 2012/0289147 | A1* | 11/2012 | Raleigh | ............... | H04L 67/2847 455/3.06 |
| 2013/0064306 | A1* | 3/2013 | Mamidwar | .......... | H04N 19/152 375/240.26 |
| 2014/0089503 | A1* | 3/2014 | Thyni | ................. | H04L 41/0668 709/224 |
| 2014/0105111 | A1* | 4/2014 | Karaoguz | ............. | H04H 20/57 370/328 |
| 2014/0219088 | A1* | 8/2014 | Oyman | ............ | H04N 21/23439 370/231 |

* cited by examiner

Primary Examiner — David Lazaro
Assistant Examiner — Mahran Abu Roumi
(74) Attorney, Agent, or Firm — Bart A. Perkins

(57) ABSTRACT

Methods and apparatuses to adaptively deliver high-definition digital entertainment and telecommunications to client devices over various networking technologies. A gateway device receives one or more services and delivers the one or more services to one or more client devices, respectively, using a plurality of networking technologies. A controller determines which among the plurality of networking technologies to use to deliver the one or more services to the one or more client devices, respectively. To make such a determination, the controller can monitor one or more conditions of the plurality of networking technologies.

20 Claims, 4 Drawing Sheets

ADAPTIVELY DELIVERING SERVICES TO CLIENT DEVICES OVER A PLURALITY OF NETWORKING TECHNOLOGIES IN A HOME NETWORK

TECHNICAL FIELD

This disclosure is related to home networks.

BACKGROUND

A broadband communications system, for example, can be used to deliver high-definition digital entertainment and telecommunications such as video, voice, and high-speed Internet to subscriber premises. For example, a cable-based system can be used to deliver these services over an existing cable television network, which can take the form of an all-coax, all-fiber, or hybrid fiber/coax (HFC) network. In other broadband communications systems, these services can be delivered over a telephone network, which can include twisted pair (wire) communications medium, using various Digital Subscriber Line (xDSL) technologies. Customer premise equipment (CPE) devices located at subscriber premises receive these services and deliver them to the end users. The CPE devices can include, for example, cable modems (CMs) or embedded multimedia terminal adapters (eMTAs), settop boxes, and/or gateway devices, among others.

At a subscriber premise, for example, high speed Internet and voice services, can be received by an eMTA, and then delivered over an Ethernet network to a personal computer and IP telephone, respectively, for example. Video can be separately received by a settop box and delivered to a television connected to the settop box. To receive video on additional televisions at the subscriber premise, an additional settop box may be needed for each additional television to receive the video from the broadband communications system network and deliver it to the additional television connected to the settop box.

Gateway devices that merge these various receivers into a single device are emerging. Generally, gateway devices can receive video, voice, and high-speed Internet, for example, at a subscriber premise and deliver these services to their respective client devices using various pre-configured networking technologies including wired technologies (such as Ethernet and The Multimedia over Coax Alliance (MoCA®)) and wireless technologies (such as Wi-Fi™). For example, a gateway device can be pre-configured to receive high speed data and deliver it via Wi-Fi™ or Ethernet to a personal computer. The gateway device also can be pre-configured to receive video and deliver it to one or more televisions via Wi-Fi™ or a MoCA®, for example.

Home electronic devices can have more than one networking interface (e.g., USB, Ethernet, or wireless) to enable an end user to connect to various networks based on the end user's home network. However, existing gateway devices do not attempt to track the networking capabilities of the client devices connected to the gateway devices and manage the traffic delivered between the gateway device and the client devices over the various networking technologies for optimum network usage.

DETAILED DESCRIPTION

Various implementations of this disclosure receive and adaptively deliver high-definition digital entertainment and telecommunications to client devices over various networking technologies. More specifically, a gateway device can be configured to receive one or more services and deliver the one or more services to one or more client devices, respectively, using a plurality of networking technologies. A controller is configured to determine which among the plurality of networking technologies to use to deliver the one or more services to the one or more client devices, respectively. To make such a determination, the controller can monitor one or more conditions of the plurality of networking technologies.

Although this disclosure makes reference to a broadband communications system, cable-based system, and a telephone network, this disclosure is not intended to be limited to these systems and/or networks. Further, although this disclosure makes reference to CPE devices such as personal computers, settop boxes, and gateway devices, home this disclosure is not intended to be limited to any particular CPE device. Still gurther, although this disclosure makes reference to Ethernet, Wi-Fi™, and MoCA®, this disclosure is not intended to be limited to these networking technologies. It should be understood that the concepts disclosed herein can be applied to any wired or wireless system of networking technology or a combination of the foregoing.

Figure 1:
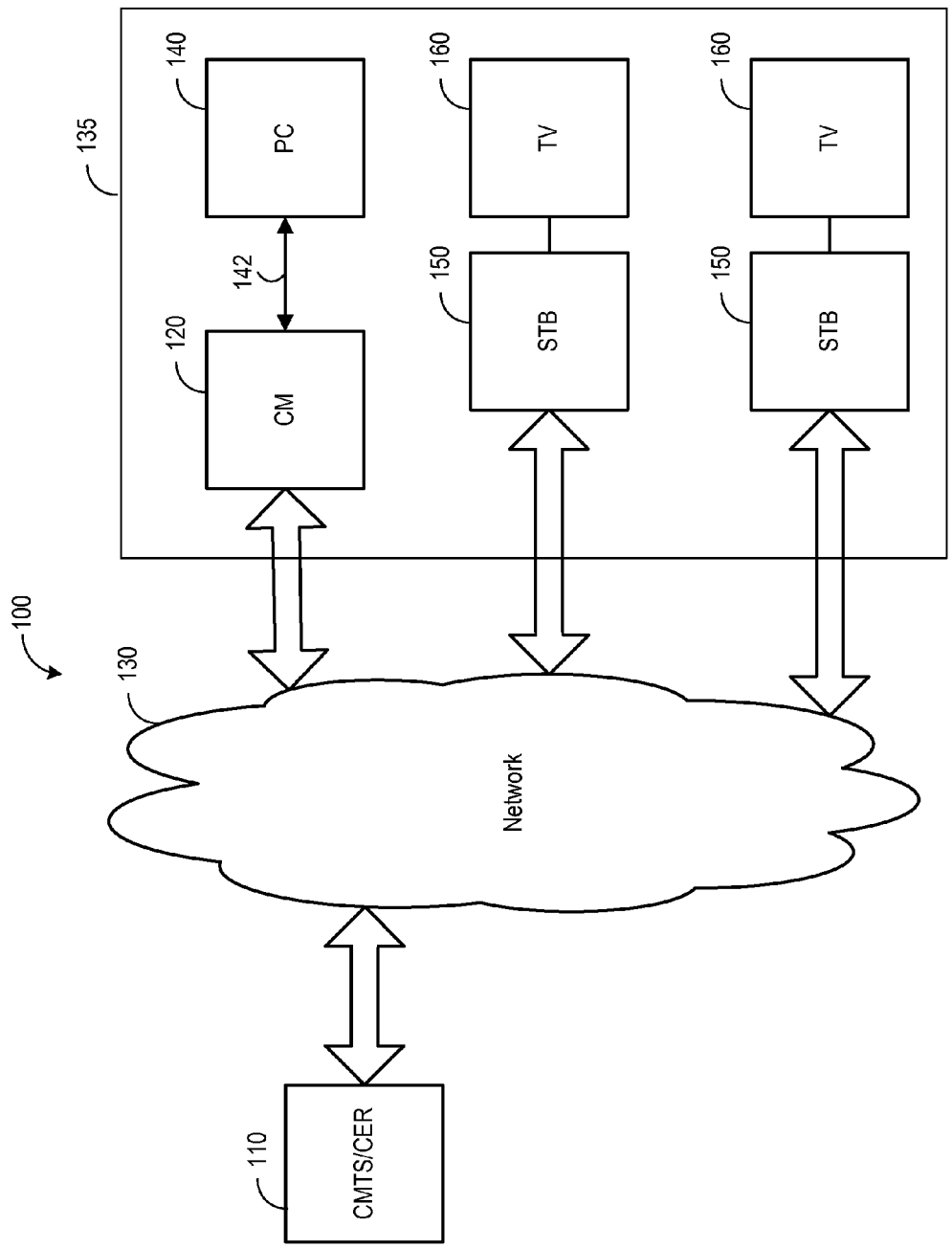
FIG. 1 is a block diagram illustrating an example broadband communications system, for example a cable-based system, operable to deliver high-definition digital entertainment and telecommunications to a subscriber premise over an existing cable television network.

FIG. 1 illustrates an example broadband communications system, for example a cable-based system, operable to deliver high-definition digital entertainment and telecommunications such as video, voice, and high-speed Internet to a subscriber premise over an existing cable television network. As shown in FIG. 1, traffic (e.g., data, video, and voice signal) can be transferred over a cable network 130 between a cable modem termination system (CMTS) or Converged Edge Router (CER) CMTS/CER 110 and a cable modem CM 120, for example, at a subscriber premise 135. The cable network 130 can take the form of an all-coax, all-fiber, or hybrid fiber/coax (HFC) network. Once the CM 120 receives traffic from the CMTS/CER 110 via the network 130, the CM 120 can deliver the traffic (e.g., high speed data) to another CPE device such as a personal computer 140 via Ethernet 142. Video can be separately received by a settop box 150 and delivered to a television 160 connected to the settop boxes 150. As discussed above, to receive video on additional televisions at the subscriber premise, an additional settop box may be needed for each additional television to receive the video from the broadband communications system network and deliver it to the additional television connected to the settop box.

Figure 2:
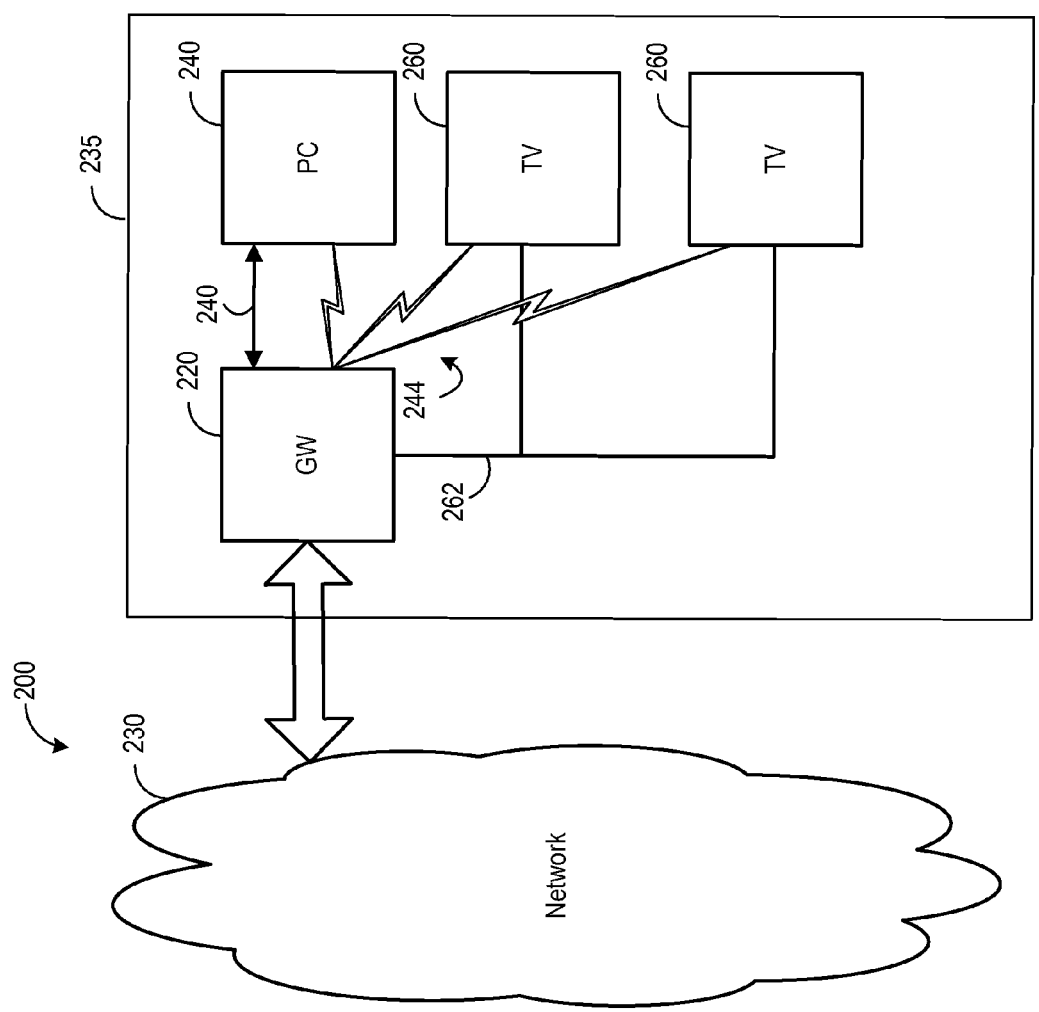
FIG. 2 is a block diagram illustrating an example subscriber premise using a gateway device to receive from a broadband communications system network video, voice, and high-speed Internet, for example, and deliver these services to client devices using various pre-configured networking technologies.

FIG. 2 illustrates an example subscriber premise using a gateway device to receive from a broadband communications system network video, voice, and high-speed Internet, for example, and deliver these services to client devices using various pre-configured networking technologies. As shown in FIG. 2, traffic can be transferred over a broadband communications system network 230 to a gateway device 220 at a subscriber premise 235. The gateway device 220 can be configured to receive high speed data and deliver it via Ethernet 242 or Wi-Fi™ 244 to a personal computer 240, for example. The gateway device 220 also can be configured to receive video and deliver it to one or more televisions 260 via MoCA® 264 or Wi-Fi™ 244, for example.

As discussed above, existing gateway devices (e.g., gateway device 220) do not attempt to track the networking capabilities of client devices (e.g., personal computer 240 and televisions 260) connected to the gateway device and manage the traffic delivered between the gateway device and the client devices over the various networking technologies (e.g., Ethernet, Wi-Fi™, MoCA®) for optimum network usage. Accordingly, it can be desirable to determine which networking technology between the gateway device and the client device is optimum for a particular task.

Figure 3:
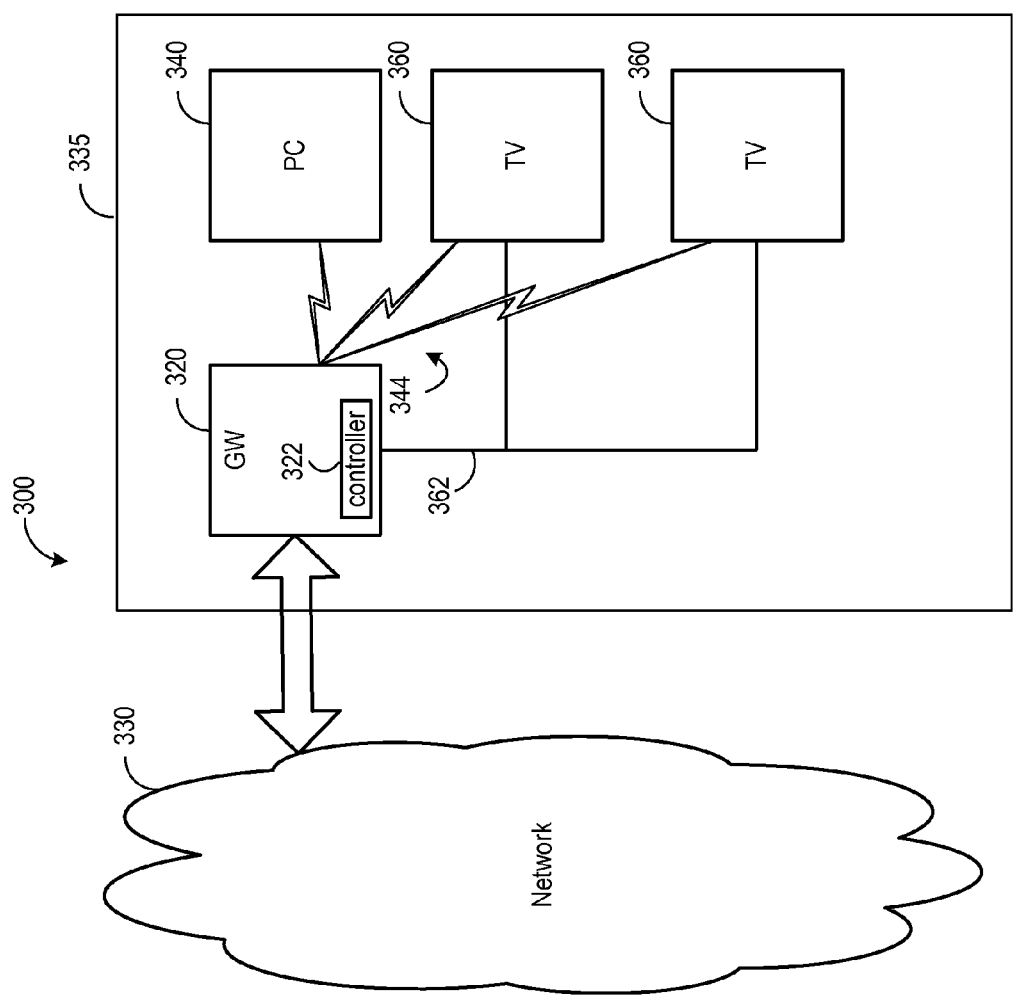
FIG. 3 is a block diagram illustrating an example implementation of an improved gateway device to receive from a broadband communications system network video, voice, and high-speed Internet, for example, at a subscriber premise and adaptively deliver these services to client devices over various networking technologies.

FIG. 3 illustrates an example implementation of an improved gateway device to receive from a broadband communications system network 230 video, voice, and high-speed Internet, for example, at a subscriber premise and adaptively deliver these services to client devices over various networking technologies. As shown in FIG. 3, the gateway device 320 includes a controller 322 that monitors the conditions of the various networking technologies (e.g., Wi-Fi™ 344, and MoCA® 362) and the networking capabilities of the client devices (e.g., personal computer 340 and televisions 360) served by these technologies and determines which networking technology to use to deliver a service to a client device. The controller 322 may make its determinations based on factors such as link bandwidth, link latency and jitter, the number of clients on each network, each client's networking capabilities, the subscriber premise network topology, traffic bandwidth profile, and traffic latency and jitter sensitivity. One of ordinary skill in the art after reading this disclosure would know how to determine which networking technology to use to deliver a service to a client device based on certain criteria. This disclosure is not limited to any particular method for making such determination. Any existing or future developed method for determining which networking technology to use to deliver a service to a client device based on certain criteria is intended to be included within the scope of this disclosure.

For example, assume that the personal computer (e.g., a laptop) 240 can support Wi-Fi™ and that the televisions 260 can support Wi-Fi™ and MoCA®. Further assume that a Wi-Fi™ connection uses less power than a MoCA® connection. If the gateway device 320 receives an IPTV program, for example, destined for one of the televisions 260, the controller 322 can determine to deliver the IPTV program to the television using Wi-Fi™ because the Wi-Fi™ connection is adequate for the amount of data being delivered and because of its lower power consumption. Assume that at a subsequent time while the gateway device 320 is still delivering the IPTV program to the television via Wi-Fi™, the gateway device 302 receives high speed data destined for the personal computer 240. The gateway device 302 can deliver the high speed data to the personal computer 240 via Wi-Fi™ and the controller 322 can monitor the conditions of the Wi-Fi™ link. If the Wi-Fi™ link becomes congested, the controller 322 can decide to deliver the remaining IPTV program to the television using MoCA®. To this end, the controller 322 can simulcast the IPTV program over Wi-Fi™ and MoCA® to the television until the MoCA® connection between the gateway device 320 and the television is established. In this way, for example, the gateway device 320 can adaptively deliver services to the client devices over various networking technologies.

Figure 4:
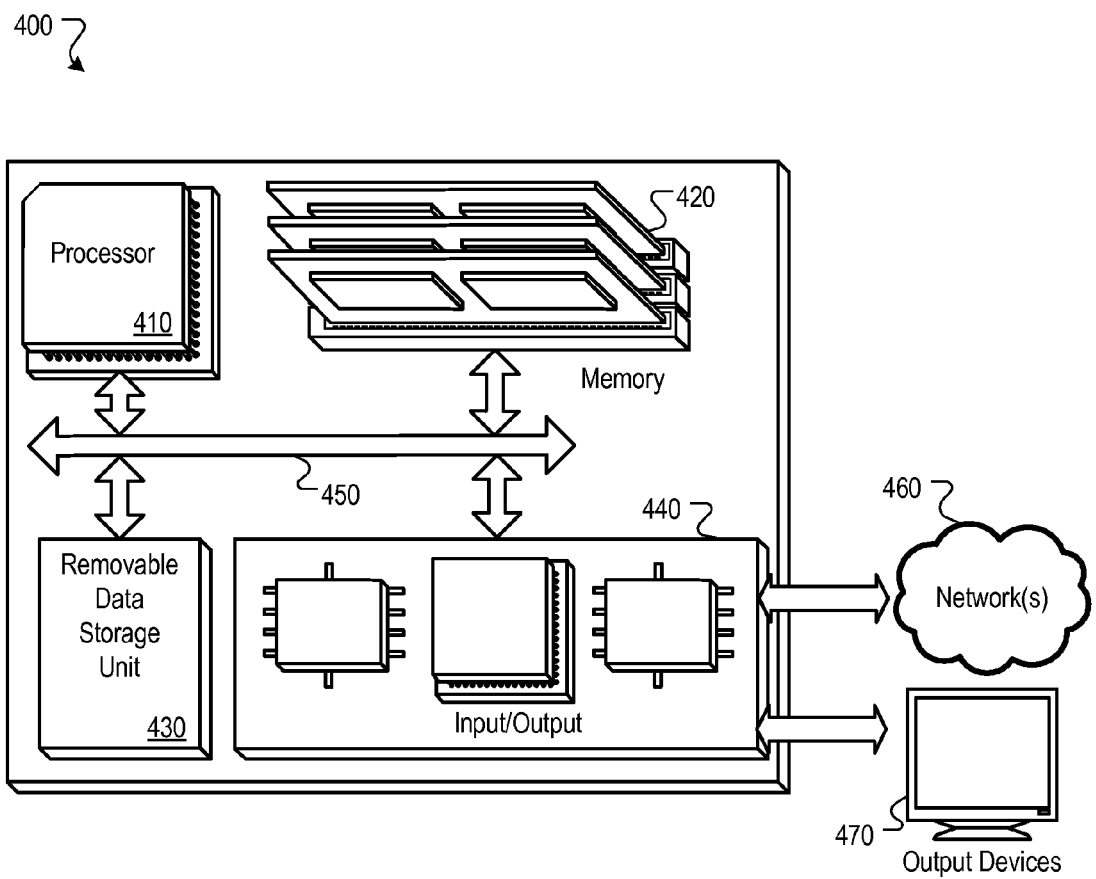
FIG. 4 is a block diagram illustrating an example broadband communications device operable to adaptively deliver high-definition digital entertainment and telecommunications to client devices over various networking technologies at a subscriber premise.

FIG. 4 illustrates an example gateway device 400 operable to adaptively deliver high-definition digital entertainment and telecommunications to client devices over various networking technologies. The gateway device 400 can include a processor 410, a memory 420, a removable data storage unit 430, and an input/output device 440. Each of the components 410, 420, 430, and 440 can, for example, be interconnected using a system bus 350. In some implementations, the gateway device 400 can include one of more interconnected boards where each board comprising components 410, 420, 430, and 440. The processor 410 is capable of processing instructions for execution within the gateway device 400. For example, the processor 410 can be capable of processing instructions for determining which network technology to use to deliver a service to a client device. In some implementations, the processor 410 is a single-threaded processor. In other implementations, the processor 410 is a multi-threaded processor. The processor 410 is capable of processing instructions stored in the memory 420 or on the storage device 430.

The memory 420 stores information within the gateway device 400. For example, memory 420 can store the networking capabilities of the client devices and the various networking technologies available at the subscriber premise 435. In some implementations, the memory 420 is a computer-readable medium. In other implementations, the memory 420 is a volatile memory unit. In still other implementations, the memory 420 is a non-volatile memory unit.

In some implementations, the storage device 430 is capable of providing mass storage for the gateway device 400. In one implementation, the storage device 430 is a computer-readable medium. In some implementations, the storage device 430 can store the networking capabilities of the client devices and the various networking technologies available at the subscriber premise 435. In some implementations, the storage device 430 is not removable. In various different implementations, the storage device 430 can, for example, include a hard disk device, an optical disk device, flash memory or some other large capacity storage device.

The input/output device 440 can provide input/output operations for the gateway device 400. In one implementation, the input/output device 440 can include one or more of a wireless interface, WAN/LAN network interface, such as, for example, an IP network interface device, e.g., an Ethernet card, a cellular network interface, a serial communication device, e.g., and RS-232 port, and/or a wireless interface device, e.g., an 802.11 card. In another implementation, the input/output device 440 can include driver devices configured to receive input data and send output data to other input/output devices, as well as sending communications to, and receiving communications from various networks.

Implementations of the device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a set-top-box (STB); an advanced television; or some other computing device that is integrated with or connected to (directly or indirectly) a display, e.g., a CRT (cathode ray tube) or LCD (liquid crystal display) monitor, for displaying information to the user. To provide for input by a user to the computer, implementations of the subject matter described in this specification further can be operable to interface with a keyboard, a pointing device (e.g., a mouse or a trackball), and/or a remote control device.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method for adaptively delivering services to client devices over a plurality of networking technologies in a home network comprising:

receiving at a customer premise device one or more services for delivery to one or more client devices, respectively, wherein the customer premise device is configured to communicate with the one or more client devices through any of a plurality of home networking technologies, and wherein each of the one or more services are operable to be delivered by at least one of the plurality of home networking technologies that exist within a home network, wherein the home networking technologies are used to carry communications between the one or more client devices and the customer premise device and the one or more services are based on a plurality of services provided to the customer premise device over a common connection; and for each respective one of the one or more services received by the customer premise device, determining, at the customer premise device, which single home networking technology among the plurality of home networking technologies to use to deliver the respective service to an associated client device, wherein determining comprises:

identifying capabilities associated with each of the plurality of network technologies and requirements associated with the respective service, the capabilities comprising information associated with the capacity for carrying communications and the condition of each network technology, and the requirements associated with the respective service comprising a network resource consumption required by the respective service;

comparing the capabilities of each respective one network technology of the plurality of network technologies with the requirements associated with the respective service; and selecting a first network technology to use based on comparing the capabilities of the network technologies to the requirements of the respective service; and wherein the method further comprises:

monitoring a condition of the first network technology;

continuing to deliver the respective service using the first network technology until the monitored condition indicates that the first network technology has become congested past a certain level; and when the first network technology has become congested past the certain level, selecting a second network technology for use in delivering the respective service, wherein the selection of the second network technology is based on comparing capabilities of the network technologies to the requirements of the respective service.

2. The method of claim 1 wherein determining which among a plurality of networking technologies to use to deliver the respective service to the one or more client devices comprises monitoring one or more conditions of the plurality of networking technologies and recording the networking capabilities of the one or more client devices.

3. The method of claim 1 further comprising delivering a service to a client device using a first delivery method based on a first determination of which among a plurality of networking technologies to use to deliver the service to the client device and changing the first delivery method to deliver the service to the client device to a second delivery method based on a second determination of which among a plurality of networking technologies to use to deliver the service to the client device.

4. The method of claim 3 wherein the first determination and the second determination is based on one or more conditions of the plurality of networking technologies.

5. The method of claim 1 wherein the determination is based on power consumption.

6. The method of claim 1 wherein the plurality of networking technologies include wireless and wired networking technologies.

7. The method of claim 1 wherein the one or more services include video and high speed data.

8. The method of claim 3, further comprising:
after the second determination of which among a plurality of networking technologies to use to deliver the service to the client device, -simulcasting the service to the client device using the second delivery method and the first delivery method until a connection between the client device and a networking technology associated with the second delivery method is established.

9. The method of claim 1, wherein the capacity for carrying communications of each respective network technology comprises link bandwidth associated with the network technology.

10. The method of claim 1, wherein the condition of each respective network technology comprises link latency and jitter associated with the respective network technology.

11. The method of claim 1, wherein the condition of each network technology comprises a number of client devices receiving one or more services using the respective network technology.

12. The method of claim 1, wherein the plurality of home networking technologies comprises Ethernet, MoCA, Wi-Fi, and/or Bluetooth.

13. A non-transitory computer readable medium having instructions for causing a computer to execute a method for adaptively delivering services to client devices over a plurality of networking technologies in a home network, the method comprising:
wherein each of one or more services are operable to be delivered by any of a plurality of home networking technologies that exist within a home network, wherein the home networking technologies are used to carry communications between one or more client devices and a customer premise device and the one or more services are based on a plurality of services provided to the customer premise device over a common connection; and
for each respective one of the one or more services, determining, at the customer premise device, which single home networking technology among a plurality of home networking technologies to use to deliver the respective service to an associated client device residing within the home network, wherein determining comprises:
identifying capabilities associated with each of the plurality of network technologies and requirements associated with the respective service, the capabilities comprising information associated with the capacity for carrying communications and the condition of each network technology and the requirements associated with the respective service comprising a network resource consumption required by the respective service;
comparing the capabilities of each respective one of the plurality of network technologies with the requirements associated with the respective service; and
selecting a first network technology to use based on comparing the capabilities of the network technologies to the requirements of the respective service;
monitoring a condition of the first network technology;
continuing to deliver the respective service using the first network technology until the monitored condition indicates that the first network technology has become congested past a certain level; and
when the first network technology has become congested past the certain level, selecting a second network technology for use in delivering the respective service, wherein the selection of the second network technology is based on comparing capabilities of the network technologies to the requirements of the respective service.

14. The non-transitory computer readable medium of claim 13, wherein the determination is based on power consumption.

15. The non-transitory computer readable medium of claim 13, wherein the method for adaptively delivering services to client devices over a plurality of networking technologies in a home network further comprises:
delivering a service to a client device using a first delivery method based on a first determination of which among a plurality of networking technologies to use to deliver the service to the client device and changing the first delivery method to deliver the service to the client device to a second delivery method based on a second determination of which among a plurality of networking technologies to use to deliver the service to the client device.

16. A system for adaptively delivering services to client devices over a plurality of networking technologies in a home network comprising:
a gateway device configured to receive one or more services and deliver the one or more services to one or more client devices, respectively, using any of a plurality of networking technologies, wherein the one or more services are operable to be delivered via any of the plurality of networking technologies; and
a controller configured to determine, for each respective one of the one or more services, which single networking technology among the plurality of networking technologies to use to deliver the respective service to an associated client device, wherein determining comprises:
identifying capabilities associated with each of the plurality of network technologies and requirements associated with the respective service, the capabilities comprising information associated with the capacity for carrying communications and the condition of each network technology and the requirements associated with the respective service comprising a network resource consumption required by the respective service;
comparing the capabilities of each respective one of the plurality of network technologies with the requirements associated with the respective service; and
selecting the network technology to use based on comparing the capabilities of the network technologies to the requirements of the respective service; and
wherein the controller is further configured to:
monitor a condition of the first network technology;
continue to deliver the respective service using the first network technology until the monitored condition indicates that the first network technology has become congested past a certain level; and when the first network technology has become congested past the certain level, selecting a second network technology for use in delivering the respective service, wherein the selection of the second network technology is based on comparing capabilities of the network technologies to the requirements of the respective service.

17. The system of claim 16, wherein the plurality of networking technologies comprises wireless and wired networking technologies.

18. The system of claim 16, wherein the one or more services comprise video and high speed data.

19. A system for adaptively delivering services to client devices over a plurality of networking technologies in a home network comprising:

means for receiving one or more services for delivery to one or more client devices, respectively, wherein each of the one or more services are operable to be delivered by any of a plurality of home networking technologies that exist within a home network, and the one or more services are based on a plurality of services provided to the home network over a common connection; and means for determining, for each respective one of the one or more services, which single networking technology among a plurality of networking technologies to use to deliver the respective service from a customer premise device to an associated client device, wherein determining comprises:

identifying capabilities associated with each of the plurality of network technologies and requirements associated with the respective service, the capabilities comprising information associated with the capacity for carrying communications and the condition of each network technology and the requirements associated with the respective service comprising a network resource consumption required by the respective service;

comparing the capabilities of each respective one of the plurality of network technologies with the requirements associated with the respective service; and selecting the network technology to use based on comparing the capabilities of the network technologies to the requirements of the respective service;

means for monitoring a condition of the first network technology;

means for continuing to deliver the respective service using the first network technology until the monitored condition indicates that the first network technology has become congested past a certain level; and means for selecting a second network technology for use in delivering the respective service when the first network technology has become congested past the certain level, wherein the selection of the second network technology is based on comparing capabilities of the network technologies to the requirements of the respective service.

20. The system of claim 19, wherein the plurality of networking technologies comprises wireless and wired networking technologies.

\* \* \* \* \*